(12) United States Patent
Sodeyama et al.

(10) Patent No.: US 12,469,924 B2
(45) Date of Patent: Nov. 11, 2025

(54) SECONDARY BATTERY, ELECTRONIC DEVICE, AND POWER TOOL

(71) Applicant: MURATA MANUFACTURING CO., LTD., Kyoto (JP)

(72) Inventors: Kunio Sodeyama, Kyoto (JP); Masafumi Umekawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 496 days.

(21) Appl. No.: 18/090,006

(22) Filed: Dec. 28, 2022

(65) Prior Publication Data

US 2023/0140258 A1 May 4, 2023

Related U.S. Application Data

(63) Continuation of application No. PCT/JP2021/033151, filed on Sep. 9, 2021.

(30) Foreign Application Priority Data

Sep. 29, 2020 (JP) ................................. 2020-163163

(51) Int. Cl.
*H01M 50/342* (2021.01)
*H01M 10/0525* (2010.01)
(Continued)

(52) U.S. Cl.
CPC ..... *H01M 50/342* (2021.01); *H01M 10/0525* (2013.01); *H01M 10/0587* (2013.01); *H01M 50/159* (2021.01); *H01M 2220/30* (2013.01)

(58) Field of Classification Search
CPC ............... H01M 10/04; H01M 10/052; H01M 10/0525; H01M 10/0587; H01M 2220/30;
(Continued)

(56) References Cited

U.S. PATENT DOCUMENTS

2003/0027038 A1* 2/2003 Tsukamoto ......... H01M 50/169
429/122
2021/0119286 A1* 4/2021 Enomoto ............ H01M 50/152

FOREIGN PATENT DOCUMENTS

JP H1040951 A 2/1998
JP 2004186117 A 7/2004
(Continued)

OTHER PUBLICATIONS

Machine translation JPH1040951A (Year: 1998).*
(Continued)

*Primary Examiner* — Victoria H Lynch
(74) *Attorney, Agent, or Firm* — K&L Gates LLP

(57) ABSTRACT

Provided is a battery capable of maintaining electrical insulation between a battery lid and a battery can when exposed to an aqueous solution such as sea water.

Disclosed is a secondary battery including an electrode winding body in which a strip-shaped positive electrode and a strip-shaped negative electrode are stacked with a separator interposed between the electrodes and wound, an electrolytic solution, and a battery can that houses the electrode winding body and the electrolytic solution, the battery can having an opening hermetically sealed by a safety valve mechanism and a battery lid with a gasket interposed therebetween, in which the battery lid includes a terminal portion and a flange portion, and a metal layer is included between an outer main surface of among main surfaces of the flange portion and the gasket.

9 Claims, 8 Drawing Sheets

(51) Int. Cl.
*H01M 10/0587* (2010.01)
*H01M 50/159* (2021.01)

(58) Field of Classification Search
CPC ............ H01M 50/103; H01M 50/107; H01M 50/119; H01M 50/15; H01M 50/152; H01M 50/159; H01M 50/164; H01M 50/167; H01M 50/169; H01M 50/171; H01M 50/184; H01M 50/186; H01M 50/188; H01M 50/191; H01M 50/193; H01M 50/197; H01M 50/198; H01M 50/342; H01M 50/3425; H01M 50/531; H01M 50/55; H01M 50/553; H01M 50/559; H01M 50/562; H01M 50/571; Y02E 60/10; Y02P 70/50
See application file for complete search history.

(56) References Cited

FOREIGN PATENT DOCUMENTS

| | | |
|---|---|---|
| JP | 2009123375 A | 6/2009 |
| JP | 2010238462 A | 10/2010 |
| JP | 2014103026 A | 6/2014 |

OTHER PUBLICATIONS

Machine translation JP2010238462A (Year: 2010).*
International Search Report of corresponding PCT application PCT/JP2021/033151, dated Nov. 30, 2021.
Japanese Office Action issued Oct. 3, 2023 in corresponding Japanese Application No. 2022-553748.

* cited by examiner

SECONDARY BATTERY, ELECTRONIC DEVICE, AND POWER TOOL

CROSS REFERENCE TO RELATED APPLICATIONS

The present application is a continuation of PCT application no. PCT/JP2021/033151, filed on Sep. 9, 2021, which claims priority to Japanese patent application no. JP2020-163163, filed on Sep. 29, 2020, the entire contents of which are herein incorporated by reference.

BACKGROUND

The present application relates to a secondary battery, an electronic device, and a power tool.

Applications of lithium ion secondary batteries have been expanded not only to portable electronic devices but also to machines, tools, and the like. For example, a lithium ion secondary battery may be used as a power source of an electric reel at the seaside or on a ship. When the electric reel gets splashes of sea water or falls into the sea water, the lithium ion secondary battery may be exposed to the sea water.

A cylindrical battery is disclosed in which a welding plate, a sealing plate made of aluminum, and a terminal plate are stacked in close contact with each other, and inserted into a hollow cylinder of a sealing gasket formed from an insulating resin, and a cylindrical battery can is sealed.

SUMMARY

The present application relates to a secondary battery, an electronic device, and a power tool.

However, the battery described in Background section has a problem that red rust precipitates between the battery can and the terminal plate when sea water spray splashes on a sealed portion, thereby causing an electrical short-circuit state, a battery voltage gradually decreases, and then the battery cannot be used as a battery.

Therefore, the present application provides a battery capable of maintaining electrical insulation between a battery lid and a battery can when the battery is exposed to an aqueous solution having ion conductivity such as sea water or salt water according to an embodiment.

In order to solve the above-described problems, the present application provides a secondary battery including an electrode winding body in which a strip-shaped positive electrode and a strip-shaped negative electrode are stacked with a separator interposed between the electrodes and wound, an electrolytic solution, and a battery can that houses the electrode winding body and the electrolytic solution, the battery can having an opening hermetically sealed by a safety valve mechanism and a battery lid with a gasket interposed therebetween, in which the battery lid includes a terminal portion and a flange portion, and a metal layer is included between an outer main surface of among main surfaces of the flange portion and the gasket according to an embodiment.

According to an embodiment, electrical insulation between the battery lid and the battery can can be maintained when the secondary battery is exposed to sea water or salt water. The contents of the present application should not be interpreted as being limited by the effects exemplified in the present specification.

DETAILED DESCRIPTION

Hereinafter, one or more embodiments of the present application will be described in further detail including with reference to the drawings.

One or more embodiments described hereinafter include preferred examples of the present application and the contents of the present application are not limited thereto.

In an embodiment, a cylindrical lithium ion battery will be described as an example of the secondary battery. A secondary battery other than the lithium ion battery or a secondary battery having a shape other than a cylindrical shape may be used.

Figure 1:
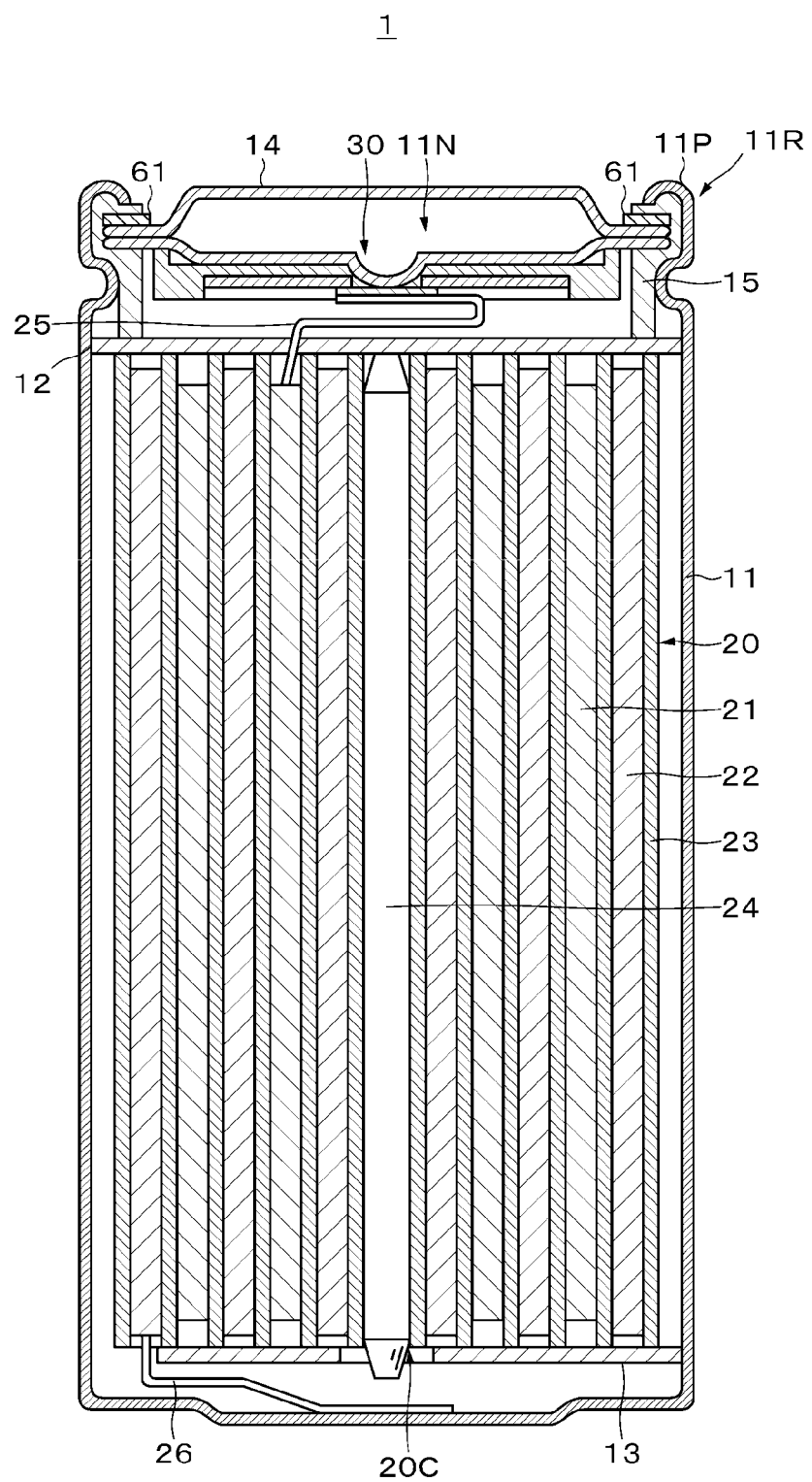
FIG. 1 is a sectional view of a battery according to an embodiment.

First, a whole configuration of the lithium ion battery will be described. FIG. 1 is a schematic sectional view of a lithium ion battery 1. For example, as shown in FIG. 1, the lithium ion battery 1 is a cylindrical battery containing an electrolytic solution and an electrode winding body 20 inside a battery can 11.

Specifically, the lithium ion battery 1 includes a pair of insulating plates 12 and 13 and the electrode winding body 20 inside the cylindrical battery can 11.

The insulating plates 12 and 13 are sheet-like plates having a surface substantially perpendicular to a winding axis direction (vertical direction in FIG. 1) of the electrode winding body 20. The insulating plates 12 and 13 are arranged to sandwich the electrode winding body 20 between them. As the material of the insulating plates 12 and 13, polyethylene terephthalate (PET), polypropylene (PP), bakelite, or the like is used. Examples of bakelite include paper bakelite and cloth bakelite produced by applying a phenolic resin to paper or cloth and then heating the paper or cloth.

An open end 11N of the battery can 11 is hermetically sealed by a crimped structure 11R. Specifically, a safety valve mechanism 30, a battery lid 14, and a metal layer 61 are stacked in close contact with each other to form the crimped structure 11R together with a gasket 15. The open end 11N of the battery can 11 is hermetically sealed in a state where the electrolytic solution and the electrode winding body 20 are housed inside the battery can 11.

The battery lid 14 is a member that closes the open end 11N of the battery can 11 in the state where the electrode winding body 20 and the like are housed inside the battery can 11. The battery lid 14 contains a material similar to a material for forming the battery can 11. The battery lid 14 has a terminal portion 53 protruding in a central axis direction of the cylindrical shape of the battery 1 of FIG. 1 in a central region. The battery lid 14 has a shape in which a flange portion 52 is integrally provided around the central region. The flange portion 52 of the battery lid 14 is in contact with the safety valve mechanism 30. The battery lid 14 is a positive electrode (positive electrode, second polarity) of battery 1. Although not shown, a PTC element such as a thermistor may be provided between the flange portion 52 of the battery lid 14 and the safety valve mechanism 30.

The gasket 15 is a member that seals a gap between the bent portion 11P (hereinafter, referred to as a crimp portion 11P) of the battery can 11 and the battery lid 14 by being interposed between the inside of the crimp portion 11P of the battery can 11 and an end of the battery lid 14. A surface of the gasket 15 may be coated with asphalt or the like, for example. In the present invention, as shown in FIG. 1, an upper end portion of the gasket 15 has a surface (hereinafter, referred to as a gasket surface 15A) exposed to the outside from a tip portion of the crimp portion 11P (a tip portion 55 of the battery can 11). A lower portion of the gasket 15 desirably extends toward the electrode winding body 20.

The gasket 15 contains an insulating material. The type of insulating material is not particularly limited, and is a polymeric material such as polybutylene terephthalate (PBT) and polypropylene (PP). This is because the gap between the crimp portion 11P and the battery lid 14 is sufficiently sealed while the battery can 11 and the battery lid 14 are electrically separated from each other.

The battery can 11 is a member that houses the electrode winding body 20. The battery can 11 is a cylindrical vessel having one end opened and the other end closed. That is, the battery can 11 has an open end (open end 11N). The battery can 11 contains one or two or more of metal materials such as iron, aluminum and their alloys. However, one or two or more of metal materials such as nickel may be plated on the surface of the battery can 11. A can bottom of the battery can 11 is a negative electrode (negative electrode, first polarity) of the battery 1.

Since the entire battery can 11 is electrically connected to the can bottom of the battery can 11, the entire battery can 11 is the negative electrode (negative electrode, first polarity) of the battery 1. The opening of the battery can 11 is hermetically sealed by the safety valve mechanism 30 and the battery lid 14 with the gasket 15 interposed therebetween.

When pressure (internal pressure) inside the battery can 11 increases, the safety valve mechanism 30 releases the internal pressure by releasing the hermetically sealed state of the battery can 11 as necessary. The cause of the increase in the internal pressure of the battery can 11 is a gas generated due to a decomposition reaction of an electrolytic solution during charge and discharge.

In the cylindrical lithium ion battery, a strip-shaped positive electrode 21 and a strip-shaped negative electrode 22 are spirally wound with the separator 23 interposed therebetween, and are housed in the battery can 11 in a state of being impregnated with the electrolytic solution. Although not shown, the positive electrode 21 and the negative electrode 22 are obtained by forming a positive electrode active material layer and a negative electrode active material layer on one side or both sides of a positive electrode foil and a negative electrode foil, respectively. The material of the positive electrode foil is a metal foil containing aluminum or an aluminum alloy. The material of the negative electrode foil is a metal foil containing nickel, a nickel alloy, copper, or a copper alloy. The separator 23 is a porous and insulating film, and enables movement of lithium ions while electrically insulating the positive electrode 21 and the negative electrode 22.

At the center of the electrode winding body 20, a space (center space 20C) generated when the positive electrode 21, the negative electrode 22, and the separator 23 are wound is provided, and a center pin 24 is inserted in the center space 20C (see FIG. 1). However, the center pin 24 may be omitted.

A positive electrode lead 25 is connected to the positive electrode 21, and a negative electrode lead 26 is connected to the negative electrode 22 (see FIG. 1). The positive electrode lead 25 contains a conductive material such as aluminum. The positive electrode lead 25 is connected to the safety valve mechanism 30 and electrically connected to the battery lid 14. The negative electrode lead 26 contains a conductive material such as nickel. The negative electrode lead 26 is electrically connected to the battery can 11. Detailed configurations and materials of the positive electrode 21, the negative electrode 22, the separator 23, and the electrolytic solution will be described later.

The positive electrode active material layer contains at least a positive electrode material (positive electrode active material) capable of occluding and releasing lithium, and may further contain a positive electrode binder, a positive electrode conductive agent, and the like. The positive electrode material is preferably a lithium-containing compound (for example, lithium-containing composite oxide and a lithium-containing phosphate compound.

The lithium-containing composite oxide has, for example, a layered rock salt-type or spinel-type crystal structure. The lithium-containing phosphate compound has, for example, an olivine type crystal structure.

The positive electrode binder contains synthetic rubber or a polymer compound. The synthetic rubber includes styrene-butadiene-based rubber, fluororubber, ethylene propylene diene, and the like. The polymer compound includes polyvinylidene fluoride (PVdF), polyimide, and the like.

The positive electrode conductive agent is a carbon material such as graphite, carbon black, acetylene black, or Ketjen black. However, the positive electrode conductive agent may be a metal material and a conductive polymer.

A surface of the negative electrode foil is preferably roughened. This makes it possible to improve close-contact characteristics of the negative electrode active material layer with respect to the negative electrode foil by a so-called anchor effect. As a method of roughening, for example, there is a method of forming fine particles using an electrolytic method and providing irregularities on the surface of the negative electrode foil. A copper foil fabricated by the electrolytic method is generally called "electrolytic copper foil".

The negative electrode active material layer contains at least a negative electrode material (negative electrode active material) capable of occluding and releasing lithium, and may further contain a negative electrode binder, a negative electrode conductive agent, and the like.

The negative electrode material contains, for example, a carbon material. The carbon material causes an extremely small change in a crystal structure thereof when lithium is inserted or extracted, which stably achieves high energy density. Further, the carbon material also serves as the negative electrode conductive agent, which improves conductivity of the negative electrode active material layer.

The carbon material is easily graphitizable carbon, non-graphitizable carbon, graphite, low crystalline carbon, or amorphous carbon. The shape of the carbon material is fibrous, spherical, granular, or scaly.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0<x\leq2$)), silicon carbide (SiC), an alloy of carbon and silicon, and lithium titanate (LTO).

In the lithium ion battery 1, in the case where an open circuit voltage (that is, a battery voltage) in a fully charged state is not less than 4.25 V, an extraction amount of lithium per unit mass is larger than that in the case where the open circuit voltage in the fully charged state is low, if the same positive electrode active material is used. Accordingly, high energy density is obtained.

The separator 23 is a porous film containing a resin, and may be a stacked film of two or more kinds of porous films. Examples of the resin include polypropylene and polyethylene.

The separator 23 may include a resin layer on one side or both sides of a porous membrane as a substrate layer. The reason for this is that, this allows for an improvement in close-contact characteristics of the separator 23 with respect to each of the positive electrode 21 and the negative electrode 22, thereby suppressing distortion of the electrode winding body 20.

The resin layer contains a resin such as PVdF. When the resin layer is formed, the substrate layer is coated with a solution prepared by dissolving the resin in an organic solvent, and thereafter, the substrate layer is dried. Alternatively, the substrate layer may be immersed in the solution, and thereafter the substrate layer may be dried. The resin layer preferably contains inorganic particles or organic particles from the viewpoint of improving heat resistance and safety of the battery. The type of the inorganic particles is aluminum oxide, aluminum nitride, aluminum hydroxide, magnesium hydroxide, boehmite, talc, silica, mica, or the like. In place of the resin layer, a surface layer formed by a sputtering method, an ALD (atomic layer deposition) method, and other methods and mainly composed of inorganic particles may be used.

The electrolytic solution contains a solvent and an electrolyte salt, and may further contain an additive and the like as necessary. The solvent is a non-aqueous solvent such as an organic solvent, or water. An electrolytic solution containing a non-aqueous solvent is referred to as a non-aqueous electrolytic solution. The non-aqueous solvent is a cyclic carbonate ester, a chain carbonate ester, lactone, a chain carboxylic ester, or nitrile (mononitrile).

Although a representative example of the electrolyte salt is a lithium salt, a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts may be used in mixture, and among them, it is preferable to use $LiPF_6$ and $LiBF_4$ in mixture from the viewpoint of improving battery characteristics. The content of the electrolyte salt is not particularly limited, and is preferably from 0.3 mol/kg to 3 mol/kg with respect to the solvent.

Subsequently, a method of manufacturing a secondary battery will be described. First, when fabricating the positive electrode 21, a positive electrode mixture is fabricated by mixing the positive electrode active material, the positive electrode binder, and the positive electrode conductive agent. Subsequently, the positive electrode mixture is dispersed in an organic solvent to prepare paste positive electrode mixture slurry. Subsequently, both surfaces of the positive electrode foil are coated with the positive electrode mixture slurry, and thereafter, the coated positive electrode mixture slurry is dried to form a positive electrode active material layer. Subsequently, while heating the positive electrode active material layer, the positive electrode active material layer is compression-molded using a roll pressing machine to obtain the positive electrode 21.

Also when fabricating the negative electrode 22, the negative electrode 22 is produced by the same procedure as that for the positive electrode 21 described above.

Next, the positive electrode lead 25 and the negative electrode lead 26 are connected to the positive electrode foil and the negative electrode foil, respectively, using a welding method. Subsequently, the positive electrode 21 and the negative electrode 22 are stacked with the separator 23 interposed therebetween and then wound, and a fixing tape is attached to an outermost peripheral surface of the separator 23 to form the electrode winding body 20.

Subsequently, the electrode winding body 20 is housed inside the battery can 11 in a state where an insulator is in contact with the side of the electrode winding body 20 where the negative electrode lead 26 is exposed, and the can bottom and the negative electrode lead 26 are connected using a welding method. Next, the insulator is also placed on the side of the electrode winding body 20 where the positive electrode lead 25 is exposed, and one end of the positive electrode lead 25 is connected to the safety valve mechanism 30 using a welding method.

Subsequently, the battery can 11 is processed using a beading machine (grooving machine) to form a recess in the battery can 11. Subsequently, an electrolytic solution is injected into the battery can 11 to impregnate the electrode winding body 20 with the electrolytic solution.

Subsequently, the safety valve mechanism 30, the battery lid 14, and the metal layer 61 are housed inside the battery can 11 together with the gasket 15.

Finally, as shown in FIG. 1, at the open end 11N of the battery can 11, the metal layer 61, the battery lid 14, and the safety valve mechanism 30 are brought into close contact with each other to form the crimped structure 11R.

EXAMPLES

Hereinafter, the present application will be specifically described based on Examples regarding a voltage drop rate after a salt water durability test and a success rate in a drop test using the battery produced as described above. The present application is not limited to Examples described below.

Figure 2:
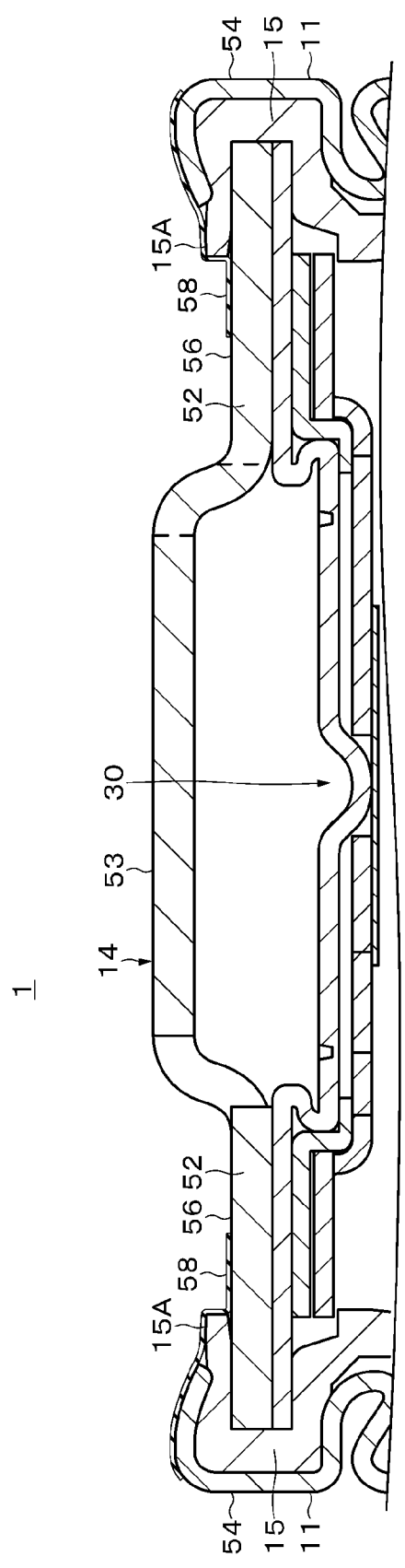
FIG. 2 is a view for explaining a deposit on the battery.

The material of the battery lid 14 was iron or stainless steel. In this case, if the battery is in an aqueous solution such as sea water or salt water, Fe (iron) as a main component of the battery lid 14 dissolves and chemically changes to an oxide or hydroxide of Fe in the aqueous solution, and as shown in FIG. 2, a precipitate 58 may be deposited from the battery lid 14 to the battery can 11. At this time, since some oxides of Fe among the precipitates 58 have high electrical conductivity (for example, red rust), electricity may flow between the battery lid 14 (positive electrode) and the battery can 11 (negative electrode), and the battery 1 may be short-circuited.

Thus, in an embodiment, the metal layer 61 having a disk shape with a through hole at the center and made of aluminum is provided. Al (aluminum) has a higher ionization tendency than Fe (iron), and Al is a stable substance in air. For example, when the metal layer 61 is disposed so as to be in contact with a main surface 56 on the outer side of the flange portion 52 of the battery lid 14, in the battery, in an aqueous solution such as sea water or salt water, Al of the metal layer 61 is preferentially dissolved rather than Fe of the battery lid 14, and Al becomes, for example, an oxide or a hydroxide and precipitates from the battery lid 14 to the battery can 11; however, since the oxide or the hydroxide of Al has an electrical insulation property, electricity does not flow between the battery lid 14 and the battery can 11, and it is considered that the battery is not short-circuited. The metal layer 61 is disposed between the battery lid 14 and the gasket 15, and is disposed such that at least a part thereof is in contact with the battery lid 14. Here, among the main surfaces of the flange portion 52, a surface facing the safety valve mechanism 31 is referred to as an inner main surface, and a surface opposite thereto is referred to as an outer main surface. Details will be described in the following examples.

Figure 3:
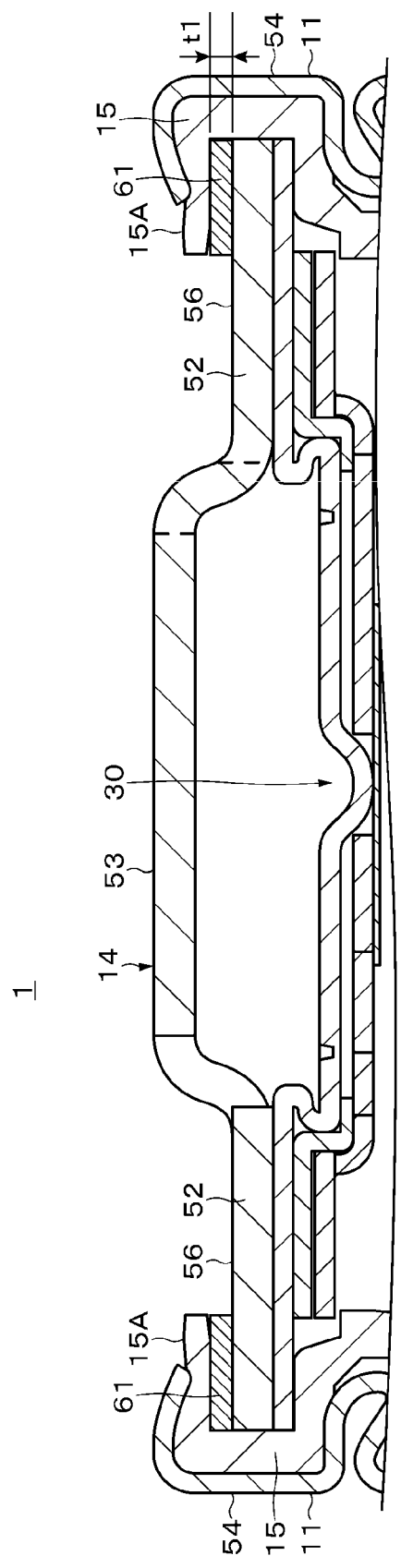
FIG. 3 is a view for explaining Examples 1 to 4.

First, as shown in FIG. 3, an outer diameter OD and an inner diameter ID (specifically, see FIG. 4) of the metal layer 61 were set to constant values, and batteries having the metal layers 61 having different thicknesses were compared. Hereinafter, an outer diameter of the flange portion 52 of the battery lid 14 was set to 19.3 mm, and an inner diameter was set to 9.6 mm. An inner diameter GID of a distal end portion of the gasket 15 was set to 16.8 mmm. The size of the battery was 18650 (diameter: 18 mm, length: 65 mm) having a cylindrical shape.

Example 1 as shown in FIG. 3, a battery was produced in which the metal layer 61 made of aluminum was disposed between the outer main surface 56 among the main surfaces of the flange portion 52 of the battery lid 14 and the gasket 15. A thickness $t1$ of the metal layer 61 was set to 0.2 mm. The outer diameter OD of the metal layer 61 was set to 19.3 mm, and the inner diameter ID of the metal layer 61 was set to 16.0 mm.

Example 2

The procedure was similar to that of Example 1, except that the thickness $t1$ of the metal layer 61 was 0.3 mm.

Example 3

The procedure was similar to that of Example 1, except that the thickness $t1$ of the metal layer 61 was 0.5 mm.

Example 4

The procedure was similar to that of Example 1, except that the thickness $t1$ of the metal layer 61 was 0.6 mm.

Comparative Example

The procedure was similar to that in Example 1 except that the metal layer 61 was not disposed.

The batteries of Examples 1 to 4 and Comparative Example described above were subjected to a salt water durability test to measure the voltage drop rate. In addition, the drop test was performed to determine the success rate. The salt water durability test is a test in which cellotape (registered trademark) is wound around a side surface portion 54 of the battery can 11 in a cylindrical shape to prepare a cellotape (registered trademark) tube at an upper portion of the battery lid 14, salt water (1 wt % sodium chloride aqueous solution) is put in the tube so that the water surface has a height of 10 mm, and the tube is left to stand in an environment of room temperature (about 23° C.) for 2 hours.

The voltage drop rate is a ratio of the voltage drop before and after the test to the open circuit voltage before the test. An average value of the voltage drop rates was calculated by setting the number of tests to 10 for each example. The drop test is a test in which a battery charged with an open circuit voltage of 4.4 V is dropped 30 times from a height of 10 m onto a concrete floor surface. The success rate in the drop test is obtained by visually observing the battery immediately after the test, counting the number of batteries in which the electrolytic solution does not leak to the outside of the battery, and determining the ratio. The number of tests was 100 for each example. The results are shown in Table 1 below.

TABLE 1

|  | Thickness t1 of metal layer (mm) | Voltage drop rate (%) | Success rate in drop test (%) |
| --- | --- | --- | --- |
| Example 1 | 0.2 | 2.0 | 100 |
| Example 2 | 0.3 | 1.0 | 100 |
| Example 3 | 0.5 | 0.5 | 90 |
| Example 4 | 0.6 | 0.4 | 80 |
| Comparative Example | — | 5.5 | 100 |

While the voltage drop rate of the comparative example was 5.5%, the voltage drop rate could be remarkably reduced when the thickness $t1$ of the metal layer 61 was from 0.2 mm to 0.6 mm. It has been confirmed that the voltage drop can be suppressed if a sealed portion of the battery is exposed to salt water by disposing the metal layer 61 made of aluminum between the outer main surface 56 among the main surfaces of the flange portion 52 of the battery lid 14 and the gasket 15. When the thickness $t1$ of the metal layer 61 is 0.2 mm or more, handling in an assembly process as a single metal member is easy and deformation hardly occurs, which is preferable. It has been found that as the thickness $t1$ of the aluminum layer, which is the metal layer 61, is larger, a voltage drop is less likely to occur, so that electrical insulation between the battery lid 14 and the battery can 11 can be maintained. It could be verified that the battery of the present application is a highly reliable battery which is less likely to cause an electrical short circuit when the sealed portion gets splashes of sea water or salt water during use, and can be used without impairing the battery function.

Next, the thickness $t1$ and the outer diameter OD of the metal layer 61 were set to constant values, batteries having different inner diameters ID of a ring were produced, and the voltage drop rates after the salt water durability test were compared.

Figure 4:
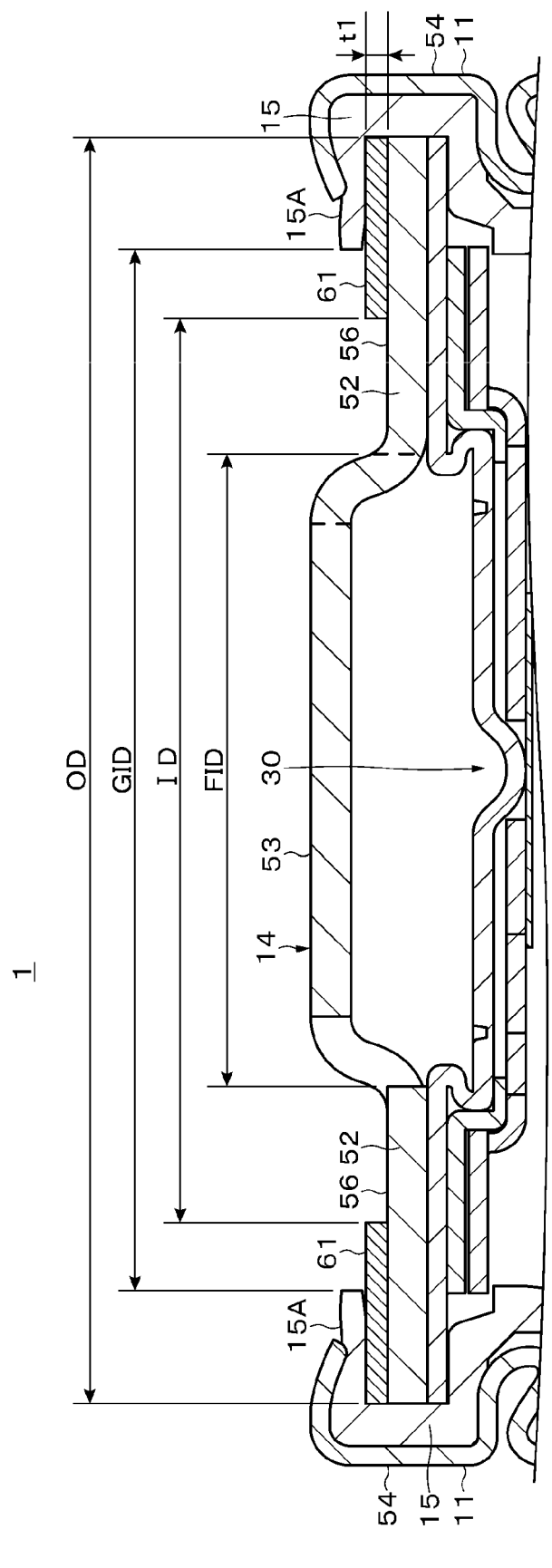
FIG. 4 is a view for explaining Examples 5 to 8.

Example 5 as shown in FIG. 4, the metal layer 61 made of aluminum was disposed between the flange portion 52 of the battery lid 14 and the gasket 15. Among the main surfaces of the flange portion 52, at least a part of the main surface exposed to the outside of the battery was disposed so as to be covered with the metal layer 61. The outer diameter OD of the metal layer 61 was set to 19.3 mm, the thickness $t1$ of the metal layer 61 was set to 0.3 mm, the inner diameter ID of the metal layer 61 was set to 17.0 mm, and an inner diameter FID of the flange portion was set to 9.6 mm. An inner diameter GID of a distal end portion of the gasket 15 was set to 16.8 mmm.

Example 6

The procedure was similar to that of Example 5, except that the inner diameter ID of the metal layer 61 was 15.0 mm.

Example 7

The procedure was similar to that of Example 5, except that the inner diameter ID of the metal layer 61 was 13.0 mm.

Example 8

The procedure was similar to that of Example 5, except that the inner diameter ID of the metal layer 61 was 9.6 mm.

The battery of the example described above was subjected to the salt water durability test as described above to measure the voltage drop rate. The results are shown in Table 2 below. An occupancy shown in Table 2 is a ratio of a surface area of one main surface of the metal layer 61 to a surface area (221.3 mm$^2$) of the outer main surface 56 among the main surfaces of the flange portion 52 of the battery lid 14.

TABLE 2

|  | Outer diameter OD of metal layer (mm) | Inner diameter ID of metal layer (mm) | Surface area of metal layer (mm$^2$) | Occupancy (%) | Voltage drop rate (%) |
| --- | --- | --- | --- | --- | --- |
| Example 5 | 19.3 | 17.0 | 66.2 | 30 | 2.0 |
| Example 6 | 19.3 | 15.0 | 116.4 | 53 | 1.0 |
| Example 7 | 19.3 | 13.0 | 160.4 | 72 | 0.7 |
| Example 8 | 19.3 | 9.6 | 221.3 | 100 | 0.5 |

In Examples 2 and 5, the inner diameter ID of the metal layer 61 is larger than the inner diameter GID of the distal end portion of the gasket 15. On the other hand, in Example 6, the inner diameter ID of the metal layer 61 is smaller than the inner diameter GID of the distal end portion of the gasket 15. Therefore, it has been confirmed that the effect of reducing the voltage drop rate is high when the inner diameter ID of the metal layer 61 is smaller than the inner diameter GID of the distal end portion of the gasket 15. This is considered to be because the larger the surface area of the metal layer 61 exposed between the flange portion 52 and the gasket 15, the larger the effect that the metal layer 61 melts out earlier than Fe of the battery lid 14. In addition, in Examples 7 and 8, since the occupancy of the outer main surface 56 among the main surfaces of the flange portion 52 is high, it has been found that the effect of reducing the voltage drop rate is further high. When the inner diameter ID of the metal layer 61 is 15.0 mm or less (occupancy is 53% or more), the electrical insulation between the battery lid 14 and the battery can 11 can be kept higher, which is preferable. When the inner diameter ID of the metal layer 61 is 13.0 mm or less (occupancy is 72% or more), the electrical insulation between the battery lid 14 and the battery can 11 can be kept higher, which is more preferable.

Next, a clad metal in which an aluminum layer was roll-bonded to one surface of a base material layer 62 of stainless steel (SUS 430) was subjected to press working to produce the battery lid 14. A battery having the battery lid 14 in which the thickness of the aluminum layer 63 was changed was prepared.

Figure 5:
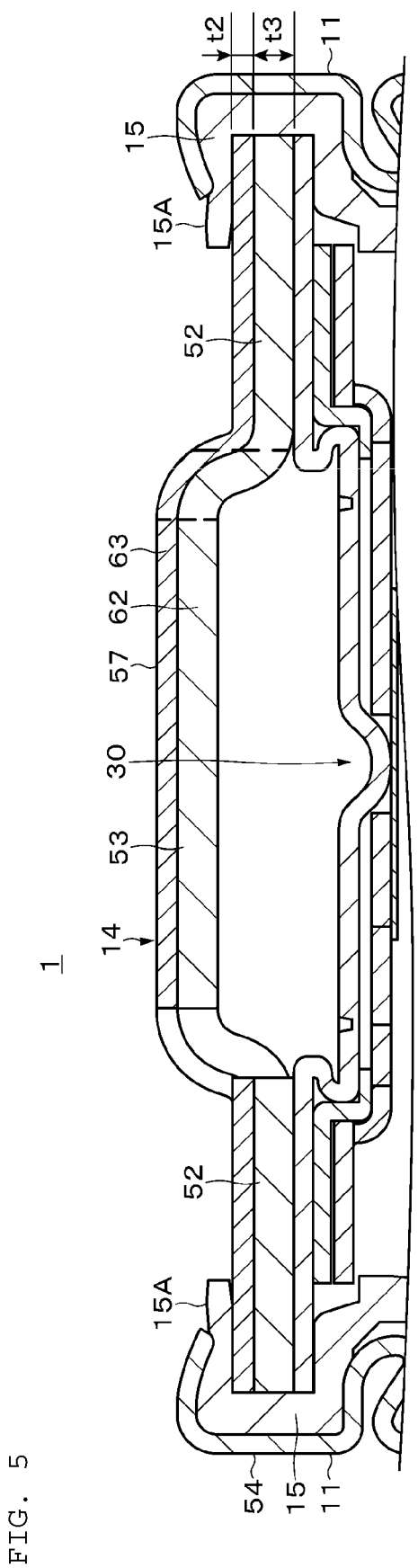
FIG. 5 is a view for explaining Examples 9 to 13.

Example 9 as shown in FIG. 5, the aluminum layer 63 as a metal layer is disposed on the entire outer main surface of the battery lid 14. A battery was produced in which the thickness of the aluminum layer 63 was 0.03 mm, the thickness of the base material layer 62 was 0.57 mm, and the thickness of the battery lid 14 (the sum of the thickness of the aluminum layer 63 and the thickness of the base material layer 62) was 0.60 mm.

Example 10

The procedure was similar to that of Example 9, except that the thickness of the aluminum layer 63 was 0.05 mm, and the thickness of the base material layer 62 was 0.55 mm.

Example 11

The procedure was similar to that of Example 9, except that the thickness of the aluminum layer 63 was 0.10 mm, and the thickness of the base material layer 62 was 0.50 mm.

Example 12

The procedure was similar to that of Example 9, except that the thickness of the aluminum layer 63 was 0.20 mm, and the thickness of the base material layer 62 was 0.40 mm.

Example 13

The procedure was similar to that of Example 9, except that the thickness of the aluminum layer 63 was 0.25 mm, and the thickness of the base material layer 62 was 0.35 mm.

The battery of the example described above was subjected to the salt water durability test to measure the voltage drop rate, and subjected to the drop test to obtain the success rate. The results are shown in Table 3 below.

TABLE 3

|  | Thickness t2 of aluminum layer (mm) | Thickness t3 of base material layer (mm) | Thickness of battery lid (mm) | Voltage drop rate (%) | Success rate in drop test (%) |
| --- | --- | --- | --- | --- | --- |
| Example 9 | 0.03 | 0.57 | 0.60 | 2.0 | 100 |
| Example 10 | 0.05 | 0.55 | 0.60 | 0.5 | 100 |
| Example 11 | 0.10 | 0.50 | 0.60 | 0.3 | 90 |
| Example 12 | 0.20 | 0.40 | 0.60 | 0.3 | 90 |
| Example 13 | 0.25 | 0.35 | 0.60 | 0.3 | 80 |

In the case of the battery structure in which the aluminum layer 63 is disposed on the entire outer main surface of the battery lid 14, from the results of the voltage drop rate of Comparative Example and Example 9 to Example 13, it was found that when a thickness t2 of the aluminum layer was from 0.03 mm to 0.25 mm, the effect of reducing the voltage drop rate was obtained. When the thickness t2 is from 0.05 mm to 0.25 mm, the effect of reducing the voltage drop rate is high, which is preferable. It can be said that when the thickness t2 is from 0.10 mm to 0.25 mm, the effect of reducing the voltage drop rate is further high, which is more preferable.

One or more embodiments of the present application has been specifically described above; however, the contents of the present application are not limited thereto, and various modifications of the present application can be made.

In an embodiment, although the size of the battery is 18650 (diameter: 18 mm, length: 65 mm) having a cylindrical shape, the size of the battery may be 21700 (diameter: 21 mm, length: 70 mm) or another size.

The material of the metal layer 61 may be Zn (zinc) which is a substance having a higher ionization tendency than that of Fe and stable in air. The material of the metal layer 61 may contain any two or more of aluminum, an aluminum alloy, zinc, and a zinc alloy. The metal layer 61 may be a layer included in the roll-bonded clad material. The metal layer 61 may be a layer formed on a surface of the base material by electrolytic plating or electroless plating.

Figure 6:
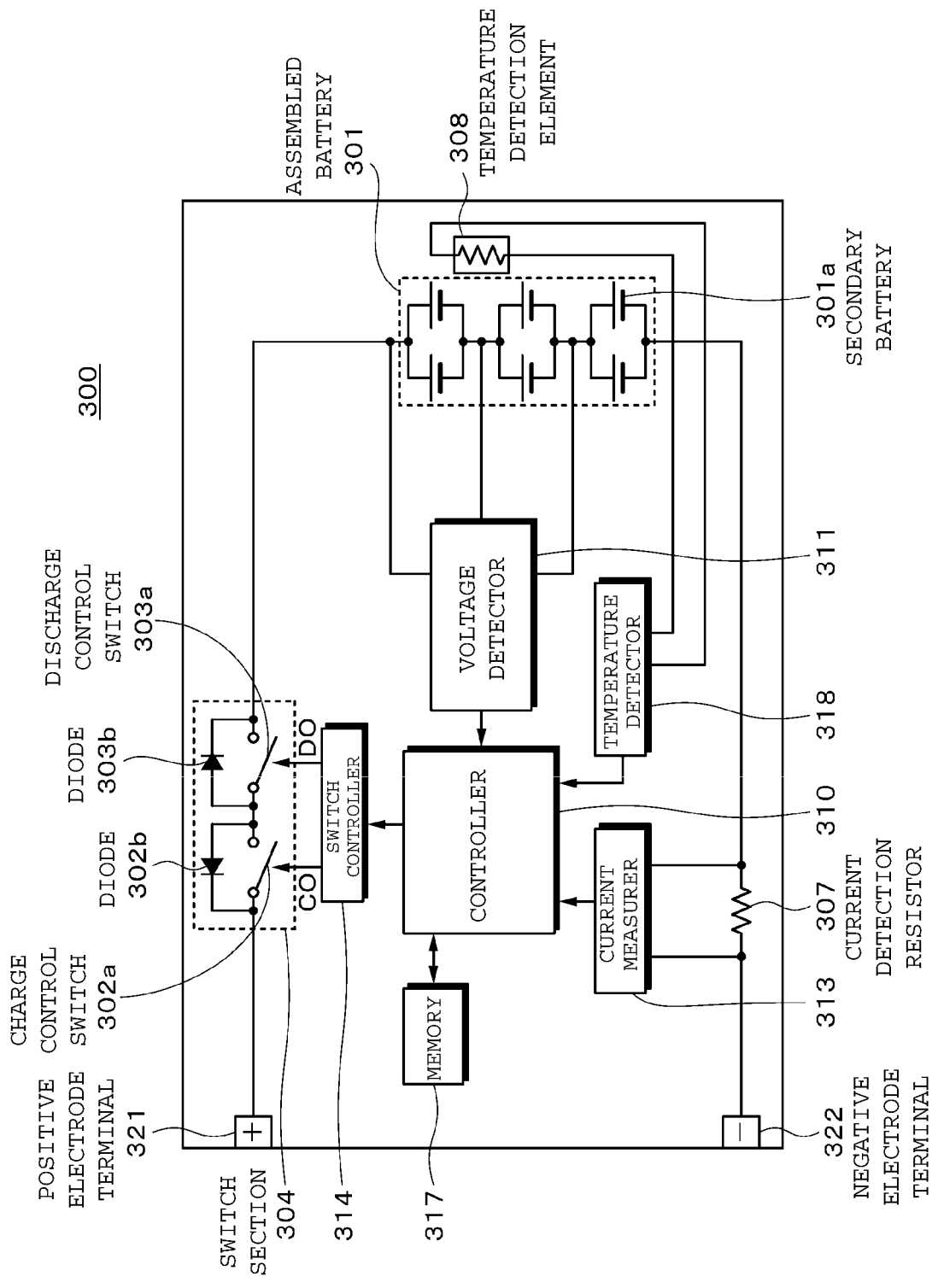
FIG. 6 is a connection diagram used for describing a battery pack as an application example of the present application.

FIG. 6 is a block diagram showing a circuit configuration example in a case where the secondary battery according to an embodiment including Examples is applied to a battery pack 300. The battery pack 300 includes an assembled battery 301, a switch section 304 including a charge control switch 302a and a discharge control switch 303a, a current detection resistor 307, a temperature detection element 308, and a controller 310. The controller 310 can control each device, further perform charge and discharge control at the time of abnormal heat generation, and calculate and correct a remaining capacity of the battery pack 300. The lithium ion battery of the present application can be applied to a battery constituting the assembled battery 301.

During charging of the battery pack 300, a positive electrode terminal 321 and a negative electrode terminal 322 are connected to a positive electrode terminal and a negative electrode terminal of a charger, respectively, and charging is performed. At the time of using an electronic device connected to the battery pack 300, the positive electrode terminal 321 and the negative electrode terminal 322 are connected to a positive electrode terminal and a negative electrode terminal of the electronic device, respectively, and discharging is performed.

The assembled battery 301 is formed by connecting a plurality of secondary batteries 301a to each other in series and/or in parallel. FIG. 6 shows, as an example, a case where the six secondary batteries 301a are connected to each other in 2 parallel 3 series (2P3S); however, any connection method may be used.

The temperature detector 318 is connected to a temperature detection element 308 (for example, a thermistor), measures the temperature of the assembled battery 301 or the battery pack 300, and supplies the measured temperature to the controller 310. A voltage detector 311 measures the voltage of the assembled battery 301 and the respective secondary batteries 301a configuring the assembled battery and performs A/D conversion of this measured voltage to supply the resulting voltage to the controller 310. A current measurer 313 measures the current by using the current detection resistor 307 and supplies this measured current to the controller 310.

A switch controller 314 controls the charge control switch 302a and the discharge control switch 303a of the switch section 304 based on the voltage and the current input from the voltage detector 311 and the current measurer 313. When a voltage of any one of the secondary batteries 301a becomes equal to or lower than an overcharge detection voltage or overdischarge detection voltage, and when a large amount of current rapidly flows, the switch controller 314 sends an OFF control signal to the switch section 304, and thereby prevents overcharge, overdischarge, and overcurrent charge/discharge. Here, when the secondary battery is a lithium ion secondary battery, the overcharge detection voltage is determined to be, for example, 4.20 V±0.05 V, and the overdischarge detection voltage is determined to be, for example, 2.4 V±0.1 V.

After the charge control switch 302a or the discharge control switch 303a is turned off, charging or discharging can be performed only through a diode 302b or a diode 303b. As these charge/discharge switches, a semiconductor switch such as a MOSFET can be used. In this case, a parasitic diode of a MOSFET functions as the diodes 302b and 303b. In FIG. 6, the switch section 304 is provided on a plus (+) side, but may be provided on a minus (−) side.

In the memory 317, a numerical value calculated by the controller 310, the battery characteristics of each of the secondary batteries 301a in an initial state, measured at a stage of a manufacturing step, and the like are previously stored, and can be rewritten appropriately. In addition, by storing a full charge capacity of the secondary battery 301a, a remaining capacity can be calculated in cooperation with the controller 310.

The secondary battery according to an embodiment including Examples of the present application described above is mounted on a device such as an electronic device, an electric transportation device, or a power storage device, and can be used for supplying electric power.

Examples of the electronic device include notebook personal computers, smartphones, tablet terminals, PDAs (personal digital assistants), mobile phones, wearable terminals, video movies, digital still cameras, electronic books, music players, headphones, game machines, pacemakers, hearing aids, power tools, televisions, lighting devices, toys, medical devices, and robots. In addition, electric transportation devices, power storage devices, power tools, and electric unmanned aerial vehicles to be described later can also be included in the electronic device in a broad sense.

Examples of the electric transportation device include electric vehicles (including hybrid vehicles), electric motorcycles, electric assisted bicycles, electric buses, electric carts, automatic guided vehicles (AGV), and railway vehicles. In addition, electric passenger aircrafts and electric unmanned aircrafts for transportation are also included. The secondary battery according to the present invention is used not only as these driving power supplies but also as an auxiliary power supply, a power supply for recovering a regenerated energy, and other power supplies.

Examples of the power storage device include power storage modules for commercial use or household use, and power supplies for electric power storage use for a building such as a house, a building, or an office, or for a power-generating facility.

Figure 7:
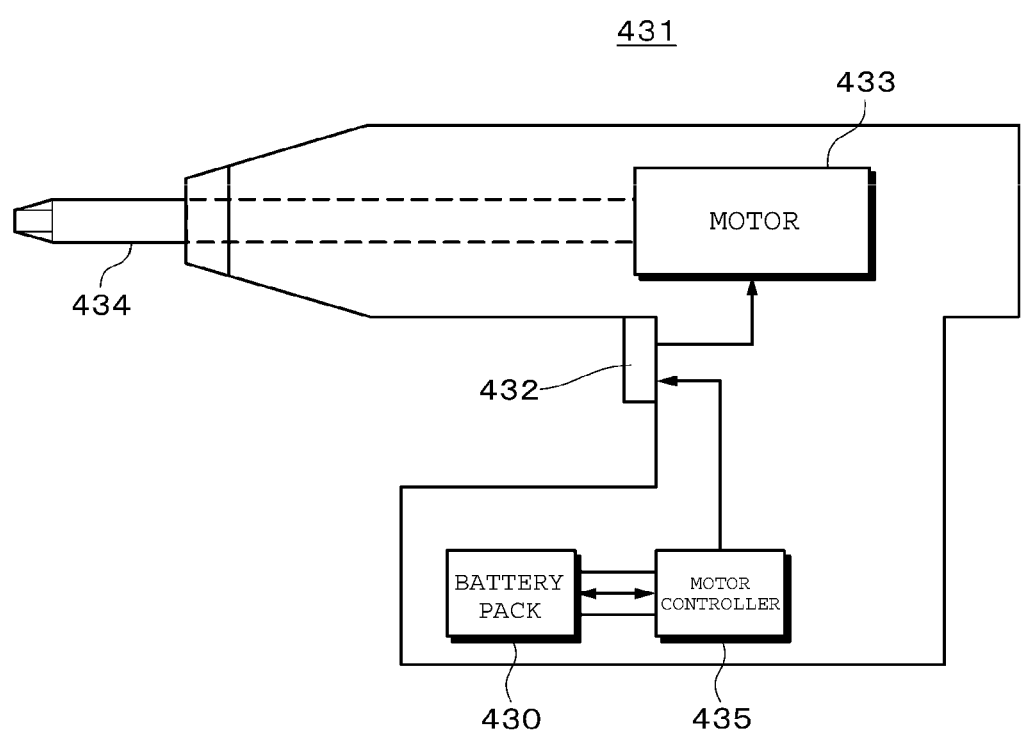
FIG. 7 is a connection diagram used for describing a power tool as an application example of the present application.

An example of an electric driver as a power tool to which the present application can be applied will be schematically described with reference to FIG. 7. An electric driver 431 is provided with a motor 433 that transmits rotational power to a shaft 434 and a trigger switch 432 operated by a user. A screw or the like is driven into a target object by the shaft 434 by the operation of the trigger switch 432.

A battery pack 430 and a motor controller 435 are housed in a lower housing of a handle of the electric driver 431. As the battery pack 430, the battery pack 300 described above can be used. The battery pack 430 is built in the electric driver 431 or is detachable. The battery pack 430 can be attached to a charging device in a state of being built in or removed from the electric driver 431. The secondary battery of the present application can be applied to a battery included in the battery pack 430.

Each of the battery pack 430 and the motor controller 435 includes a microcomputer. Power is supplied from the battery pack 430 to the motor controller 435, and charge/discharge information of the battery pack 430 is communicated between microcomputers of the battery pack 430 and the motor controller 435. The motor controller 435 can control rotation/stop and a rotation direction of the motor 433, and can further cut off power supply to a load (such as the motor 433) at the time of overdischarge.

Figure 8:
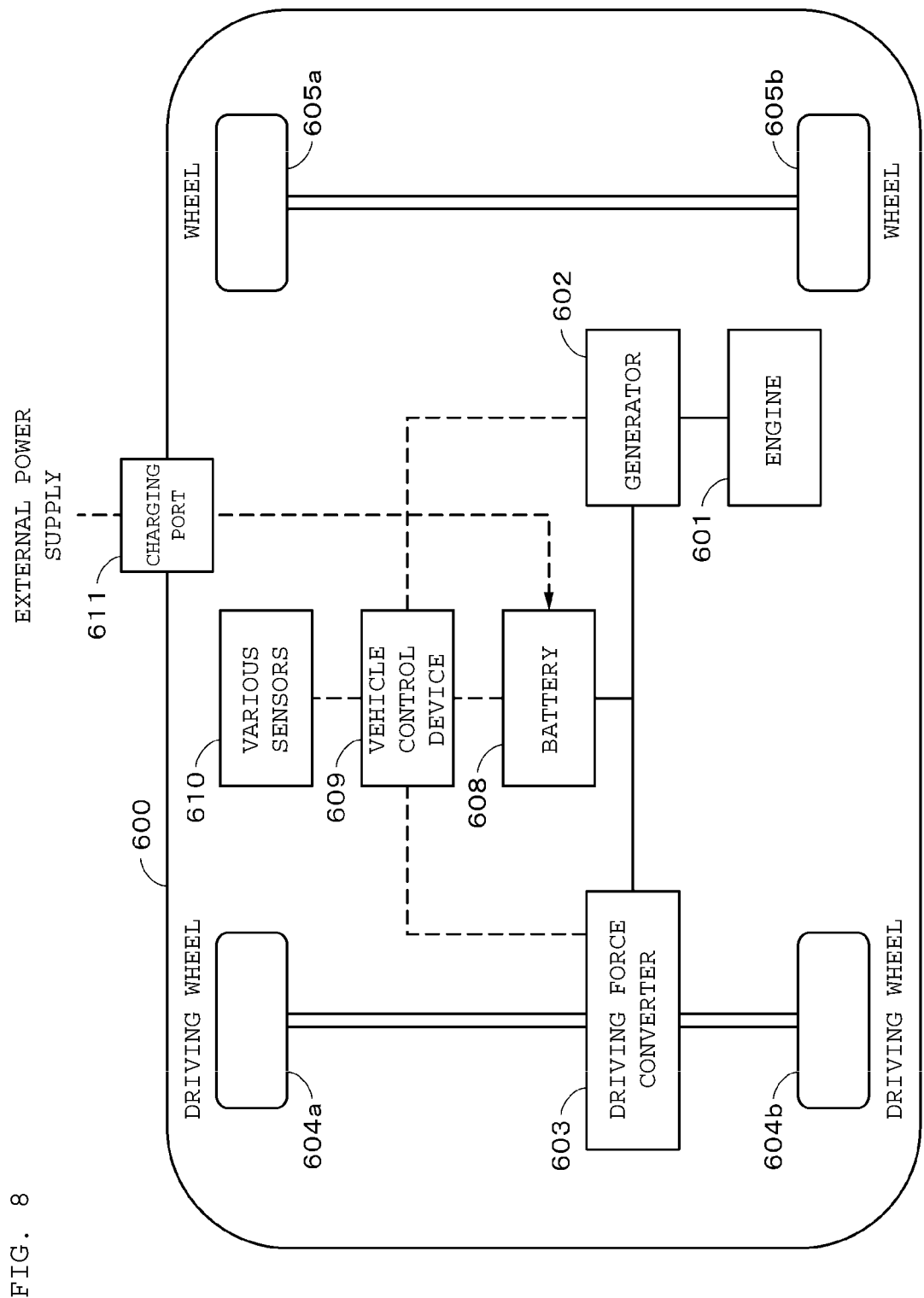
FIG. 8 is a connection diagram used for describing an electric vehicle as an application example of the present application.

As an example in which the present application is applied to an electric vehicle power storage system, FIG. 8 schematically shows a configuration example of a hybrid vehicle (HV) employing a series hybrid system. The series hybrid system is a car travelling with an electric power driving force converter using electric power generated by a generator powered by an engine or electric power obtained by temporarily storing the generated electric power in a battery.

An engine 601, a generator 602, an electric power driving force converter 603 (DC motor or AC motor, hereinafter, it is simply referred to as the "motor 603"), a driving wheel 604*a*, a driving wheel 604*b*, a wheel 605*a*, a wheel 605*b*, a battery 608, a vehicle control device 609, various sensors 610, and a charging port 611 are mounted in a hybrid vehicle 600. For the battery 608, the battery of the present invention described above or a power storage module on which a plurality of the batteries of the present invention are mounted can be applied. The secondary battery has a cylindrical shape, a rectangular shape, or a laminate shape. The secondary battery of the present invention can be applied to a battery included in the battery 608.

The motor 603 is operated by the electric power of the battery 608, and a rotating force of the motor 603 is transmitted to the driving wheels 604*a* and 604*b*. A rotating force of the engine 601 is transmitted to the generator 602, and electric power generated by the generator 602 can be stored in the battery 608 by the rotating force. The various sensors 610 control an engine speed through the vehicle control device 609, or control an opening degree of a throttle valve (not shown). The various sensors 610 include a velocity sensor, an acceleration sensor, an engine speed sensor, and the like.

When the hybrid vehicle 600 is decelerated by a brake mechanism (not shown), a resistance force during the deceleration is added as a rotating force to the motor 603, and regenerative electric power generated due to this rotating force is stored in the battery 608. Although not shown, an information processing device (for example, a remaining battery level display device) for performing information processing relating to vehicle control based on information on a secondary battery may be included. The battery 608 is connected to an external power supply via the charging port 611 of the hybrid vehicle 600, thereby being capable of receiving power supply and storing power. Such an HV vehicle is referred to as a plug-in hybrid vehicle (PHV or PHEV).

Although a series hybrid vehicle has been described above as an example, the present application is also applicable to a parallel system using an engine and a motor together or a hybrid vehicle in which a series system and a parallel system are combined. In addition, the present application is also applicable to an electric vehicle (EV or BEV) and a fuel cell vehicle (FCV) that travel only by a drive motor not using an engine.

DESCRIPTION OF REFERENCE SYMBOLS

1: Lithium ion battery
12, 13: Insulating plate
21: Positive electrode
22: Negative electrode
23: Separator
24: Center pin
25: Positive electrode lead
26: Negative electrode lead
41: Insulating layer
52: Flange portion
53: Terminal portion
54: Side surface portion of battery can
56: Main surface
57: Main surface
58: Precipitate
61: Metal layer
62: Base material layer
63: Aluminum layer It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
    an electrode winding body in which a strip-shaped positive electrode and a strip-shaped negative electrode are stacked with a separator interposed between the strip-shaped positive electrode and the strip-shaped negative electrode and wound;
    an electrolytic solution; and
    a battery can that houses the electrode winding body and the electrolytic solution, the battery can having an opening hermetically sealed by a safety valve mechanism and a battery lid with a gasket interposed therebetween,
    wherein
    the battery lid includes a terminal portion and a flange portion, and
    a metal layer is included between an outer main surface of among main surfaces of the flange portion and the gasket,
    wherein the metal layer is a disk-shaped metal member having a through hole.

2. The secondary battery according to claim 1, wherein the metal layer is a layer containing any one or more of aluminum, an aluminum alloy, zinc or a zinc alloy.

3. The secondary battery according to claim 2, wherein a thickness of the metal layer is 0.2 mm or more and 0.6 mm or less.

4. The secondary battery according to claim 1, wherein a diameter of the through hole is smaller than an inner diameter of a distal end portion of the gasket.

5. The secondary battery according to claim 1, wherein the metal layer is on the entirety of an outer main surface of the battery lid.

6. The secondary battery according to claim 5, wherein the thickness of the metal layer is 0.03 mm or more and 0.25 mm or less.

7. The secondary battery according to claim 1, wherein the metal layer is a roll-bonded metal layer.

8. An electronic device comprising the secondary battery according to claim 1.

9. A power tool comprising the secondary battery according to claim 1.

* * * * *